United States Patent
Anderson et al.

(10) Patent No.: US 6,873,755 B2
(45) Date of Patent: Mar. 29, 2005

(54) WAVELENGTH ROUTER WITH STAGGERED INPUT/OUTPUT FIBERS

(75) Inventors: Robert Anderson, Boulder, CO (US); Samuel P. Weaver, Boulder, CO (US)

(73) Assignee: PTS Corporation, San Jose, CA (US)

( * ) Notice: Subject to any disclaimer, the term of this patent is extended or adjusted under 35 U.S.C. 154(b) by 590 days.

(21) Appl. No.: 09/747,064

(22) Filed: Dec. 20, 2000

(65) Prior Publication Data

US 2005/0041914 A1 Feb. 24, 2005

(51) Int. Cl.[7] .............................. G02B 6/26; G02B 6/42
(52) U.S. Cl. .............................. 385/18; 385/16; 385/17; 385/20; 385/21; 385/31; 385/39; 385/47; 359/223; 359/226; 359/627; 359/877; 398/45; 398/48; 398/49
(58) Field of Search ............................. 385/16–18, 20, 385/21, 31, 39, 47; 359/223, 226, 627, 877; 398/45, 48, 49

(56) References Cited

U.S. PATENT DOCUMENTS

| | | | | |
|---|---|---|---|---|
| 5,414,540 | A | | 5/1995 | Patel et al. .................... 359/39 |
| 5,917,625 | A | | 6/1999 | Ogusu et al. ................ 359/130 |
| 5,960,133 | A | | 9/1999 | Tomlinson .................... 385/18 |
| 5,999,672 | A | | 12/1999 | Hunter et al. .................. 385/37 |
| 6,097,519 | A | | 8/2000 | Ford et al. ................... 359/130 |
| 6,097,859 | A | | 8/2000 | Solgaard et al. .............. 385/17 |
| 6,108,471 | A | | 8/2000 | Zhang et al. .................. 385/37 |
| 6,289,145 | B1 | * | 9/2001 | Solgaard et al. .............. 385/17 |
| 6,307,657 | B1 | | 10/2001 | Ford ........................... 359/130 |
| 6,330,102 | B1 | * | 12/2001 | Daneman et al. ........... 359/290 |
| 6,337,760 | B1 | * | 1/2002 | Huibers et al. .............. 359/291 |
| 6,363,182 | B2 | * | 3/2002 | Mills et al. .................... 385/17 |
| 6,437,902 | B2 | * | 8/2002 | Daneman et al. ........... 359/290 |
| 6,453,083 | B1 | | 9/2002 | Husain et al. ................. 385/17 |
| 6,466,711 | B1 | * | 10/2002 | Laor et al. ..................... 385/18 |
| 6,501,877 | B1 | * | 12/2002 | Weverka et al. ............... 385/31 |
| 6,529,307 | B1 | | 3/2003 | Peng et al. .................. 359/256 |
| 6,535,664 | B1 | * | 3/2003 | Anderson ..................... 385/18 |
| 6,542,657 | B2 | * | 4/2003 | Anderson ..................... 385/18 |
| 6,574,026 | B2 | * | 6/2003 | Jin et al. ...................... 359/224 |
| 6,668,108 | B1 | * | 12/2003 | Helkey et al. ................. 385/18 |
| 6,760,506 | B2 | * | 7/2004 | Laor ............................ 385/18 |
| 2001/0048784 | A1 | * | 12/2001 | Behin et al. ................... 385/18 |

OTHER PUBLICATIONS

Sun, et al., "Demultiplexer with 120 Channels and 0.29–nm Channel Spacing," IEEE Photonics Technology Letters, vol. 10, No. 1, Jan. 1998, pp. 90–92.

Nishi et al., "Broad–Passband–Width Optical Filter for Multi/Demultiplexer Using a Diffraction Grating and a Retroreflector Prism," Electronics Letters, vol. 21, No. 10, May 1985, pp. 423–424.

(Continued)

*Primary Examiner*—Rodney Bovernick
*Assistant Examiner*—Daniel Petkovsek
(74) *Attorney, Agent, or Firm*—Townsend and Townsend and Crew LLP

(57) ABSTRACT

An optical routing apparatus and method that achieves improved optical signal reintegration is disclosed. The optical routing apparatus includes an input port, such as may be provided at the end of an optical fiber. The signal may be routed to one or more of a plurality of output ports, such as may also be provided at the end of an optical fiber, each output port being configured to receive the optical signal. The routing between the input port and the output ports is accomplished with an optical switching arrangement that may shift among multiple distinct optical configurations, each configuration being such as to direct the optical signal to one of the output ports. The ports are positioned such that the input port and at least one of the output ports lie in different parallel planes, each such plane being orthogonal to a path along which the optical signal is provided by the input port or received by one of the output ports.

23 Claims, 4 Drawing Sheets

OTHER PUBLICATIONS

Philippe et al., "Wavelength demultiplexer: using echelette gratings on silicon substrate," Applied Optics, vol. 24, No. 7, Apr. 1985, pp. 1006–1011.

Piezo Systems, Inc. Catalog #2, 1998, pp. 1, 30–45.

Ford et al., "Wavelength Add–Drop Switching Using Micromirrors," Journal of Lightwave Technology, vol. 17, No. 5, May 1999, pp. 904–911.

U.S. Appl. No. 09/442,061, filed Nov. 16, 1999, Weverka et al.

Grade, John D. et al., "A Large–Deflection Electrostatic Actuator For Optical Switching Applications," Solid–State and Actuaotr Workshop, Hilton Head Island, SC, pp. 97–100 (Jun. 2000).

Rallison, R.D., "Dense Wavelength Division Multiplexing (DWDM) and the Dickson Grating," White Paper, Jan. 6, 2001.

* cited by examiner

WAVELENGTH ROUTER WITH STAGGERED INPUT/OUTPUT FIBERS

CROSS REFERENCES TO RELATED APPLICATIONS

This application is being filed concurrently with related U.S. patent applications: U.S. patent application Ser. No. 09/745,760. entitled "BINARY SWITCH FOR AN OPTICAL WAVELENGTH ROUTER," by Robert Anderson, now U.S. Pat. No. 6,542,657 and U.S. Pat. No. 09/745,459. entitled "1×2 OPTICAL WAVELENGTH ROUTER," by Robert Anderson, now U.S. Pat. No. 6,535,664, both of which are herein incorporated by reference in their entirety for all purposes.

BACKGROUND OF THE INVENTION

This application relates generally to fiber-optic communications and more specifically to techniques and devices for routing optical signals to different output ports (or, conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications, are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

Embodiments of the invention are directed to an optical routing apparatus and method that achieves improved optical signal reintegration with optical fibers. The optical routing apparatus includes an input port, such as may be provided at the end of an optical fiber. The signal may be routed to one or more of a plurality of output ports, such as may also be provided at the end of an optical fiber, each output port being configured to receive the optical signal. The routing between the input port and the output ports is accomplished with an optical switching arrangement that may shift among multiple distinct optical configurations, each configuration being such as to direct the optical signal to one of the output ports. The output ports are positioned such that at least one of them lies in a different parallel plane than the input port, each such plane being orthogonal to a path along which the optical signal is provided by the input port or received by one of the output ports. In one embodiment, two output ports lie in a common plane.

It is thus possible with such an arrangement for all path lengths defined by the distinct optical configurations of the optical switching arrangement, measured from input port to output port, to differ from one another by less than a confocal length of the optical signal. As a result, reintegration of the optical signal into the output ports is facilitated. In a particular embodiment, all such path lengths are approximately equal.

Embodiments of the invention may be adopted with a variety of optical switching arrangements, including 1×2 switches and modified 2×2 switches (described below and referred to as 2×2' switches), among others. In certain of these arrangements, rotatable mirrors are used (perhaps in combination with fixed mirrors) to direct the optical signals while in other arrangements, mirrors that are linearly actuated are used (also perhaps in combination with fixed mirrors).

Further embodiments of the invention are directed to a wavelength router, which receives light having a plurality of spectral bands, at an input port. The wavelength router directs subsets of the spectral bands to various output ports. A free-space optical train, which includes a dispersive element disposed to intercept light traveling from the input port, is disposed between the input port and the output ports to provide optical paths for routing the spectral bands. An array of optical routing mechanisms having a dynamically configurable routing element is configured so that each optical routing mechanism directs a given spectral band to one of the output ports. At least one of the output ports lies in a different parallel plane than the input port, each such plane being orthogonal to a path along which one of the directed spectral bands may be received by one of the output ports.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DESCRIPTION OF THE SPECIFIC EMBODIMENTS

I. Introduction

The following description sets forth embodiments of an optical switch for use in an optical wavelength router according to the invention. Embodiments of the invention can be applied to network elements such as optical add-drop multiplexers (OADMs) and wavelength-selective cross-connects (WSXCs), among others, to achieve the goals of optical networking systems.

The general functionality of one optical wavelength router that can be used with the embodiments of the invention is described in detail in the copending, commonly assigned United States Patent Application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber).

II. Optical-fiber Light-acceptance Criteria

Figure 1:
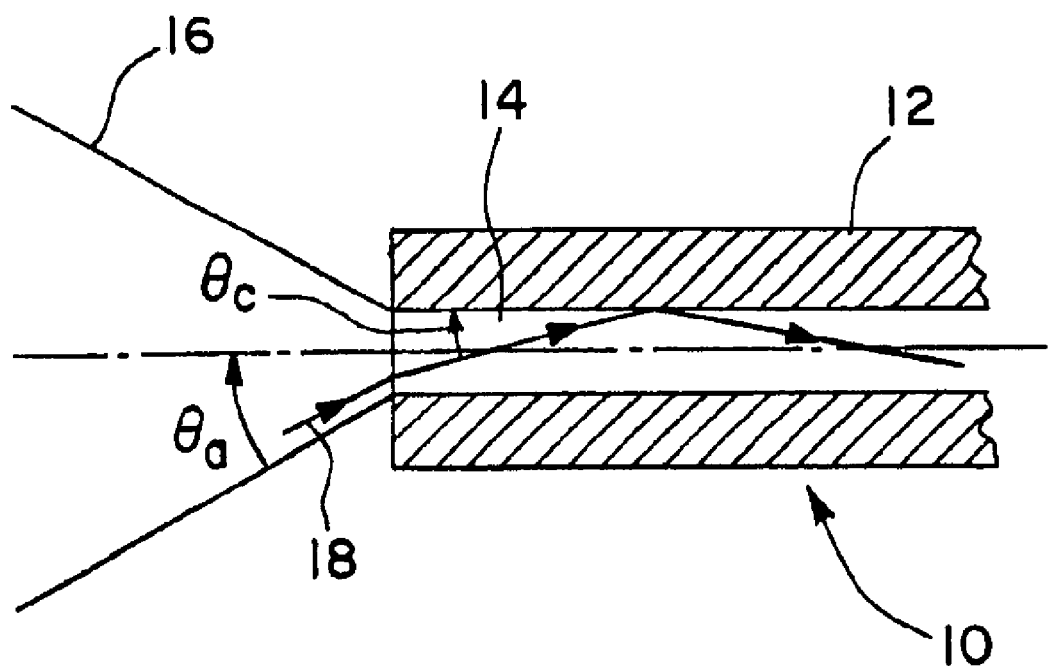
FIG. 1 illustrates the structure of an optical fiber.

The general structure of an optical fiber 10, shown in FIG. 1, comprises two principal components: a core 14 and a cladding layer 12. The core 14 is the inner part of the fiber through which light is guided. It is surrounded completely by the cladding layer 12, which has a lower refractive index so that a light ray 18 in the core 14 that strikes the core/cladding boundary at a glancing angle is confined within the core by total internal reflection. The confinement angle $\theta_c$ represents an upper limit for the angle at which the light ray 18 can strike the boundary and be confined within the core 14.

As a consequence of this optical-fiber structure, an optical beam must meet certain constraints to be properly integrated into the fiber. As shown in FIG. 1, light must fall within an acceptance cone 16, which is defined by the acceptance angle $\theta_a$, for it to be guided in the fiber core 14. The acceptance of light by the optical fiber 10 may alternatively be defined in terms of the numerical aperture A. The numerical aperture A, acceptance angle $\theta_a$, and confinement angle $\theta_c$, that characterize these optical characteristics are related to the refractive indices for the core 14 and cladding layer 12. Denoting the refractive index of the core as $n_{core}$ and of the cladding layer as $n_{clad}$, the following relationship holds:

$$A = \sqrt{n_{core}^2 - n_{clad}^2} = \sin\theta_a = n_{core}\sin\theta_c.$$

Thus, for example, a typical optical fiber will have a core refractive index $n_{core}=1.500$ and a cladding layer refractive index $n_{clad}=1.485$, only a 1% difference. With such values, the numerical aperture is A=0.212, with a confinement angle of $\theta_c=8.1°$ and an acceptance angle of $\theta_a=12.2°$.

Figure 2:
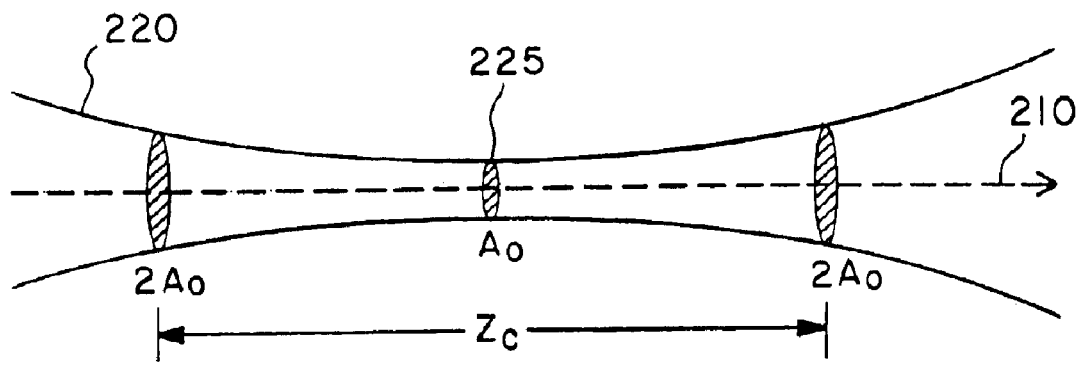
FIG. 2 shows the beam shape of an optical signal, illustrating that the beam is narrowest in the confocal region of the beam.

These optical constraints lead to known difficulties in collecting light for transmission through an optical fiber. Thus, in addition to providing the beam within the appropriate acceptance angle, the transfer of light between fibers requires careful alignment of the fibers within tight tolerances. This can be better understood with reference to FIG. 2, which shows that an optical beam outside the optical fiber, rather than propagating with a point cross-section, has a characteristic narrowing shape. As illustrated in FIG. 2, the beam. 220 propagates along axis 210, with the narrow portion of the beam 225 referred to as the "beam waist." The length of the beam waist is defined by the confocal length $Z_c$ of the beam, which is a measure of the distance along the propagation axis 210 over which the area of the beam first narrows from twice the beam waist 225 size and then expands back to twice its size at the beam waist 225, i.e. from $2A_0$ to $A_0$ to $2A_0$. Reintegration requires that the center lines of the optical beam and the core of the output port be coordinated; and that the diameters of the optical beam and the core of the output port be coordinated. In accordance with these criteria, reintegration of the optical signals is facilitated where the total path length for each of the optical paths is substantially equal so that beams are focused within their confocal zones.

III. Port Staggering for Optical Routing Mechanisms

In applications involving propagation of optical signals between input and output ports, such as may be used in a wavelength router as described in application Ser. No. 09/442,061, there is the possibility that significant bandwidth may be lost if the optical signal is not adequately reintegrated. As explained above, such reintegration is most effective if the optical signal is focussed such that it encounters the fiber core 14 within its confocal zone, so that the various criteria for effective signal reintegration are met. In particular, the beam diameter is sufficiently small within the confocal zone that little signal is lost from portions of the beam dispersed to larger diameters.

Figure 3:
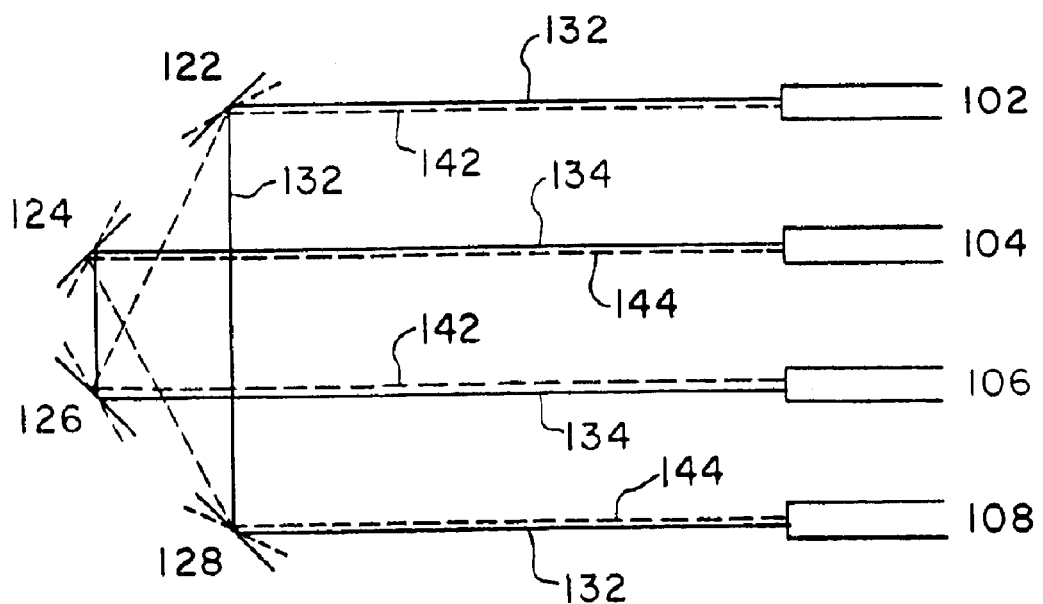
FIG. 3 illustrates schematically a 2×2 optical switch that uses four rotatable mirrors.

In various applications involving routing configurations, the path lengths followed by different optical signals may not be equal, making it difficult or impossible simultaneously to focus all of the optical signals within their respective confocal zones. For example, as shown in FIG. 3 (see also FIGS. 5A–5D of U.S. patent application Ser. No. 09/442,061), a 2×2 optical switch may be implemented with four rotatable microelectromechanical system ("MEMS") micromirrors. Because the optical signal is demultiplexed into multiple wavelength components, each MEMS micromirror shown in the illustrated configurations may thus denote an array of MEMS micromirrors for acting on each of these individual wavelength components.

In FIG. 3, the switch operation is illustrated for two configurations referred to as a "passthrough" (solid lines)

and a "crossed" configuration (dashed lines). In the passthrough configuration, an optical signal from input port 102 is directed along path 132 to output port 108, being reflected off micromirrors 122 and 128, and an optical signal from input port 104 is directed along path 134 to output port 106, being reflected off micromirrors 124 and 126. All four micromirrors 122–128 are rotated to the dashed positions when the switch is in the crossed configuration. In that configuration, an optical signal from input port 102 is directed along path 142 to output port 106, being reflected off micromirrors 122 and 126, and an optical signal from input port 104 is directed to output port 108, being reflected off micromirrors 124 and 128. It is evident that the lengths of various paths may have different lengths, depending on the precise positioning and rotation angles of the mirrors.

Accordingly, in one embodiment of the invention, the relative positions of the input and output ports are staggered relative to one another so that they do not lie within a single plane. In referring to common planes herein, such planes are understood to be orthogonal to linear beam paths originating from an input port or terminating at an output port. In particular, for example, as shown in FIG. 3, the input and output ports are positioned such that they lie in a common plane orthogonal to the signal propagation path in the immediate vicinity of the input and output ports. With such a configuration, the 2×2 optical switch may be configured so that path lengths are equalized for the passthrough and crossed configurations.

Figure 4A:
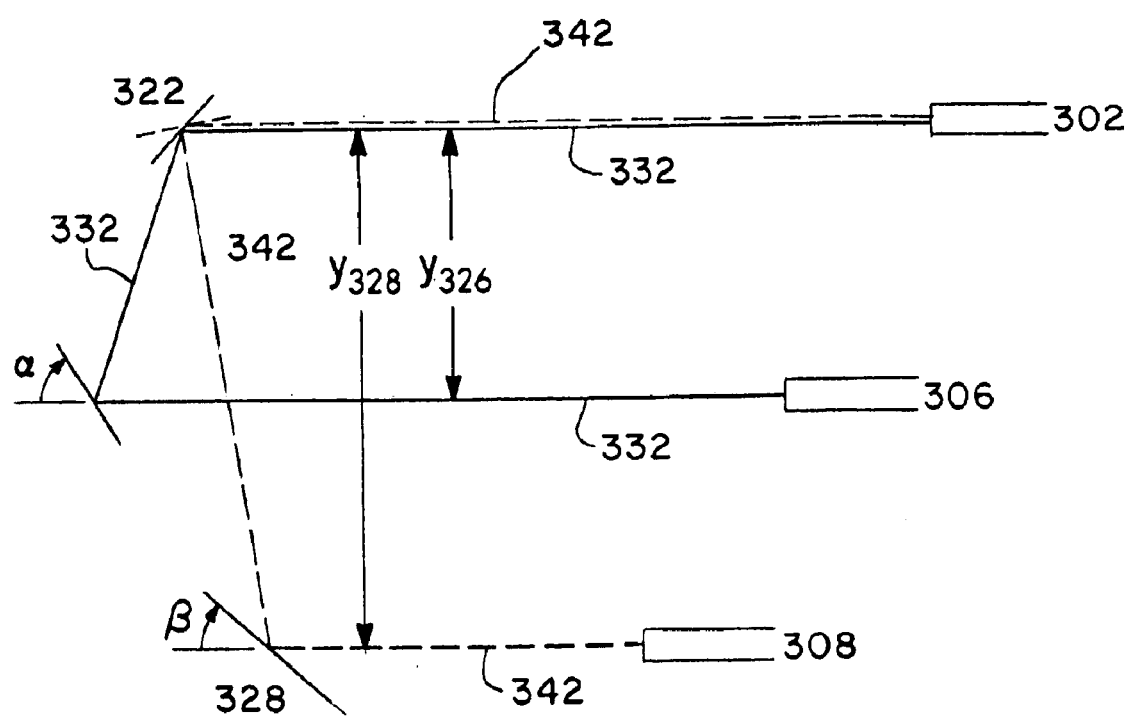
FIG. 4 illustrates schematically different configurations for a 1×2 optical switch that uses one rotatable mirror and two fixed mirrors: part (a) shows an embodiment where the output ports are not coplanar while part (b) shows a particular embodiment in which the output ports are coplanar.
Figure 4B:
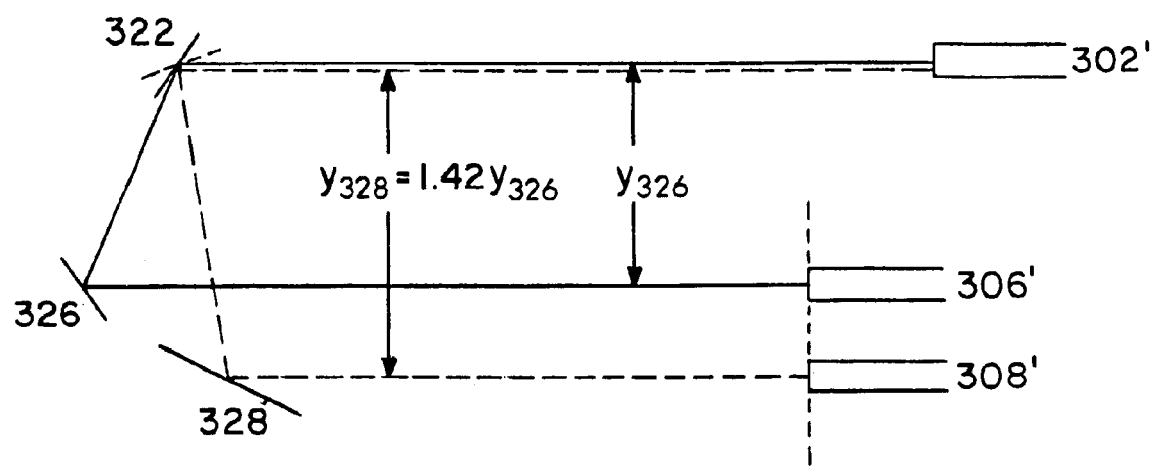

In other embodiments, the input and output ports are staggered within other optical switch configurations. For example, a 1×2 optical switch configuration that may be used in a wavelength router is described in the concurrently filed and commonly assigned U.S. Pat. No. 6,535,664 entitled "1×2 OPTICAL WAVELENGTH ROUTER" having Robert Anderson as inventor, which has herein been incorporated by reference for all purposes. A wavelength router may include an array of such 1×2 optical switches, each of which is associated with an input port and two output ports. In one embodiment, the output ports lie in different planes, such as shown in FIG. 4(a), while in another particular embodiment the output ports are coplanar, as shown in FIGS. 4(b). In each of these figures, the optical switch operates by rotating MEMS micromirror 322 to one of two positions. In the solid position, an optical signal follows path 332 from input port 302 to output port 306, reflecting off MEMS micromirror 322 and fixed mirror 326. In the dashed position, the optical signal instead follows path 342 from input port 302 to output port 308, reflecting off MEMS micromirror 322 and fixed mirror 328. In FIG. 4(b), the primes are added to the port reference numerals to distinguish their relative positions from the general configuration of FIG. 4(a).

The required stagger for ports can be expressed analytically. The path-length difference between paths 332 and 342 when all input and output ports lie in a common plane is given by $$\Delta l = \frac{y_{328}(1 - \cos 2\beta)}{\sin 2\beta} - \frac{y_{326}(1 - \cos 2\alpha)}{\sin 2\alpha}.$$

To equalize the path lengths in the staggered-fiber embodiment, either fiber 306 or fiber 308 is offset by $\Delta l$. For example, with $y_{328} = 2y_{326} = 500$ μm, $\alpha = 50°$, and $\beta = 40°$, the path length is equalized with a stagger of $\Delta l = 122$ μm. In a particular embodiment shown in FIG. 4(b), and described in greater detail in the concurrently filed and commonly assigned U.S. Pat. No. 6,535,664 entitled "1×2 OPTICAL WAVELENGTH ROUTER" which has been incorporated by reference for all purposes, the path length may be equalized by changing the separation between the output fibers without introducing a stagger.

Still other embodiments use a modified 2×2 switch arrangement, referred to as a "2×2' switch," and described in the concurrently filed and commonly assigned U.S. Pat. No. 6,542,657 entitled "BINARY SWITCH FOR AN OPTICAL WAVELENGTH ROUTER", which has been incorporated by reference for all purposes. In such embodiments, construction of the switching arrangements with coplanar input and output ports results in a length mismatch for different optical paths, leading to potential difficulties reintegrating the optical signals into the optical fibers. In accordance with the invention, the input and output ports are staggered so that they are nonplanar, approximately equalizing the path lengths to improve reintegration of the signals as described herein.

Yet further embodiments may use switch arrangements in which mirrors are linearly actuated, such as described in commonly assigned U.S. patent application Ser. No. 09/658,158, entitled "LINEAR OPTICAL BEAM TRANSLATOR FOR OPTICAL ROUTING", filed Sep. 8, 2000, having Samuel P. Weaver, Robert T. Weverka, and Richard S. Roth as inventors, which is herein incorporated by reference in its entirety for all purposes. Such embodiments may include 1×2 and 2×2' switching arrangements, among others, in which one or more mirrors are not rotated within the switching arrangement, but are instead translated linearly. Construction of certain switching arrangements that use such linear mirror translation with coplanar input and output ports may result in a length mismatch for certain optical paths. In accordance with the invention, the consequent difficulties reintegrating the optical signals into the optical fibers are mitigated by staggering input and output ports as described herein so that they are nonplanar. Such staggering may approximately equalize the path lengths dictated by different configurations of the optical switch so that reintegration of the signals is improved.

Having described several embodiments, it will be recognized by those of skill in the art that various modifications, alternative constructions, and equivalents may be used without departing from the spirit of the invention. In particular, the invention may be used with numerous other optical switching configurations that may occur to those of skill in the art after reading this disclosure. Accordingly, the above description should not be taken as limiting the scope of the invention, which is defined in the following claims.

What is claimed is:

1. An optical routing apparatus for directing an optical signal, the optical routing apparatus comprising:
    (a) an input port configured to provide the optical signal along an input path;
    (b) a plurality of output ports, each such output port being configured to receive the optical signal along a respective output path that is substantially parallel to and opposite in direction to the input path, wherein at least two of the output ports lie in different parallel planes, each such plane being orthogonal to the input path; and
    (c) an optical switching arrangement adapted to shift among a plurality of distinct optical configurations to selectively direct the optical signal from the input port to different ones of the output ports in accordance with the optical configurations.

2. The optical routing apparatus according to claim 1 wherein all path lengths defined by the distinct optical configurations of the optical switching arrangement from the input port to each output port differ by less than a confocal length of the optical signal.

3. The optical routing apparatus according to claim 1 wherein all path lengths defined by the distinct optical configurations of the optical switching arrangement from the input port to each output port are approximately equal.

4. The optical routing apparatus according to claim 1 wherein the optical switching arrangement includes a rotatable mirror off which the optical signal is reflected in at least one of the distinct optical configurations.

5. The optical routing apparatus according to claim 1 wherein the optical switching arrangement includes a linearly actuated mirror off which the optical signal is reflected in at least one of the distinct optical configurations.

6. The optical routing apparatus according to claim 1 wherein the optical switching arrangement is configured to direct a plurality of optical signals.

7. A method for directing light having a plurality of spectral bands, the method comprising:

(a) providing the light from an input port;

(b) angularly separating the spectral bands with a dispersive element; and (c) operating an optical switching arrangement adapted to shift among a plurality of distinct optical configurations to direct each of the spectral bands to different ones of a plurality of output ports, wherein at least two of the output ports lie in different parallel planes, each such plane being orthogonal to a path along which one of the spectral bands is received by one of the output ports.

8. The method according to claim 7 wherein all path lengths defined by the distinct optical configurations of the optical switching arrangement from the input port to each output port differ by less than a confocal length of the one of the spectral bands.

9. The method according to claim 7 wherein all path lengths defined by the distinct optical configurations of the optical switching arrangement from the input port to each output port are approximately equal.

10. The method according to claim 7 wherein the optical switching arrangement includes a rotatable mirror off which the one of the spectral bands is reflected in at least one of the distinct optical configurations.

11. The method according to claim 7 wherein the optical switching arrangement includes a linearly actuated mirror off which the one of the spectral bands is reflected in at least one of the distinct optical configurations.

12. A wavelength router for receiving, at an input port, light having a plurality of spectral bands and directing subsets of the spectral bands, the wavelength router comprising:

(a) a plurality of output ports for receiving the directed spectral bands, wherein at least two of the output ports lie in different parallel planes, each such plane being orthogonal to a path along which one of the directed spectral bands may be received by one of the output ports;

(b) a free-space optical train disposed between the input port and the output ports providing optical paths for routing the spectral bands, the optical train including a dispersive element disposed to intercept light traveling from the input port; and (c) an array of optical routing mechanisms having a dynamically configurable routing element, each optical routing mechanism being configured to selectively direct a given spectral band to different ones of the output ports in accordance with states of the each optical routing mechanism.

13. The wavelength router according to claim 12 wherein the dispersive element is a grating.

14. The wavelength router according to claim 13 wherein the optical train includes focusing power incorporated into the grating.

15. The wavelength router according to claim 13 wherein the grating is a reflective grating.

16. The wavelength router according to claim 13 wherein the grating is a transmissive grating.

17. The wavelength router according to claim 12 wherein all path lengths for a particular spectral band defined by a given optical routing mechanism from the input port to the output ports differ by less than a confocal length of the particular spectral band.

18. The wavelength router according to claim 12 wherein all path lengths for a particular spectral band defined by a given optical routing mechanism from the input port to the output ports are approximately equal.

19. The wavelength router according to claim 12 wherein the dynamically configurable routing element comprises a rotatable mirror off which a given spectral band is reflected in one configuration.

20. The wavelength router according to claim 12 wherein the dynamically configurable routing element comprises a linearly actuated mirror off which a given spectral band is reflected in one configuration.

21. An optical routing apparatus for directing an optical signal, the optical routing apparatus comprising:

(a) an input port configured to provide the optical signal along an input path;

(b) a plurality of output ports, each such output port being configured to receive the optical signal along a respective output path that is substantially parallel to and opposite in direction to the input path, wherein the output ports lie in a common plane orthogonal to the input path and the input port lies outside the common plane; and (c) an optical switching arrangement adapted to shift among a plurality of distinct optical configurations to selectively direct the optical signal, from the input port to different ones of the output ports in accordance with the optical configurations, wherein no orthogonal separations from the input path to a first of the output paths is an integral multiple of an orthogonal separation from the input path to a second of the output paths different from the first of the output paths.

22. The optical routing apparatus recited in claim 21 wherein all path lengths defined by the distinct optical configurations of the optical switching arrangement from the input port to each output port differ by less than a confocal length of the optical signal.

23. The optical routing apparatus recited in claim 21 wherein the optical switching arrangement includes a linearly actuated mirror off which the optical signal is reflected in at least one of the distinct optical configurations.

* * * * *